US011996229B2

(12) United States Patent
Costinett et al.

(10) Patent No.: US 11,996,229 B2
(45) Date of Patent: May 28, 2024

(54) SERIES SELF-RESONANT COIL STRUCTURE FOR CONDUCTING WIRELESS POWER TRANSFER

(71) Applicant: University of Tennessee Research Foundation, Knoxville, TN (US)

(72) Inventors: Daniel Jes Costinett, Knoxville, TN (US); Jie Li, Knoxville, TN (US); Ruiyang Qin, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 340 days.

(21) Appl. No.: 16/756,963

(22) PCT Filed: Mar. 7, 2019

(86) PCT No.: PCT/US2019/021135
§ 371 (c)(1),
(2) Date: Apr. 17, 2020

(87) PCT Pub. No.: WO2019/173579
PCT Pub. Date: Sep. 12, 2019

(65) Prior Publication Data
US 2021/0193381 A1      Jun. 24, 2021

Related U.S. Application Data

(60) Provisional application No. 62/639,768, filed on Mar. 7, 2018.

(51) Int. Cl.
*H01F 38/14*          (2006.01)
*H01F 27/28*          (2006.01)
(Continued)

(52) U.S. Cl.
CPC .......... *H01F 38/14* (2013.01); *H01F 27/2804* (2013.01); *H02J 50/005* (2020.01); *H02J 50/12* (2016.02)

(58) Field of Classification Search
CPC .......... H02J 50/005; H02J 50/12; H01F 38/14
See application file for complete search history.

(56) References Cited

U.S. PATENT DOCUMENTS 5,880,662 A *   3/1999   Person ................ H01F 17/0013
                                                                 336/200
10,389,181 B1 *   8/2019   Grundmann ............. H04B 5/26
(Continued)

FOREIGN PATENT DOCUMENTS

WO   WO 2004/004118 A1   1/2004
WO   WO 2019/173579 A1   9/2019

OTHER PUBLICATIONS

Stein et al., Thin Self-Resonant Structures with a High-Q for Wireless Power Transfer, Thayer School of Engineering, Mar. 2018, Dartmouth College, Hanover, NH 03755 USA (Year: 2018).*
(Continued)

*Primary Examiner* — Hal Kaplan
*Assistant Examiner* — Joseph N Inge
(74) *Attorney, Agent, or Firm* — Jenkins, Taylor & Hunt, P.A.

(57) ABSTRACT

Disclosed is a series self-resonant coil structure for wireless power transfer that includes a top coil element that is configured in a spiral and planar arrangement and a bottom coil element that is configured in a spiral and planar arrangement that is substantially similar to the arrangement corresponding to the top coil element, wherein the top coil element and the bottom coil element are positioned in a stacked arrangement in relation to each other. The coil structure further includes a dielectric layer element that is planarly positioned in between the top coil element and the bottom coil element, wherein the top coil element, the bottom coil element, and the dielectric layer element are aligned to produce series-resonance in the coil structure.

19 Claims, 12 Drawing Sheets

(51) Int. Cl.
   *H02J 50/00* (2016.01)
   *H02J 50/12* (2016.01)

(56) References Cited

U.S. PATENT DOCUMENTS

| | | | |
|---|---|---|---|
| 2004/0000974 A1* | 1/2004 | Odenaal | H02J 50/12 |
| | | | 333/219 |
| 2012/0098486 A1* | 4/2012 | Jung | H02J 50/90 |
| | | | 320/108 |
| 2014/0091638 A1 | 4/2014 | Azancot et al. | |
| 2015/0145634 A1* | 5/2015 | Kurz | H01F 38/14 |
| | | | 29/606 |
| 2016/0134154 A1 | 5/2016 | Baarman et al. | |
| 2017/0025899 A1* | 1/2017 | Misawa | H02M 3/3376 |
| 2018/0138732 A1* | 5/2018 | Kurz | H01F 38/14 |

OTHER PUBLICATIONS

International Preliminary Report on Patentability corresponding with international application No. PCT/US 2019/021135, dated Sep. 8, 2020.

International Search Report correcsponding with international application No. PCT/US 2019/021135, dated May 24, 2019.

Written Opinion of the Interntional Searching Authority corresponding with the international application No. PCT/US 2019/021135 dated May 24, 2019.

* cited by examiner

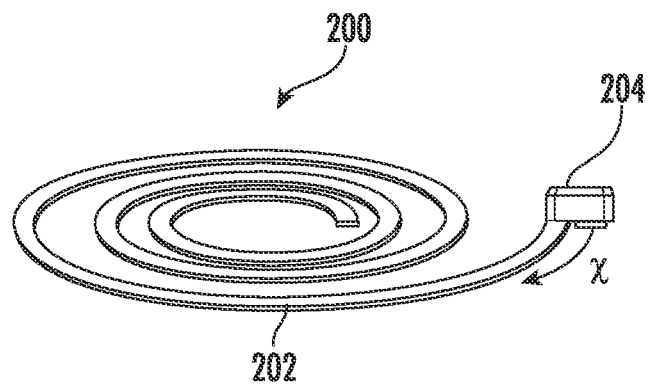
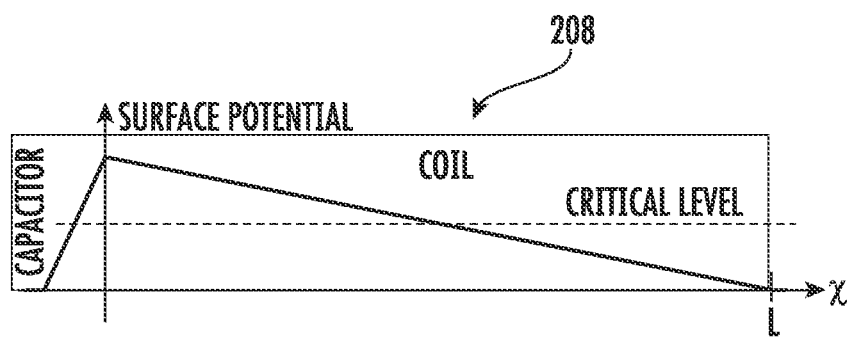
FIG. 2
(PRIOR ART)

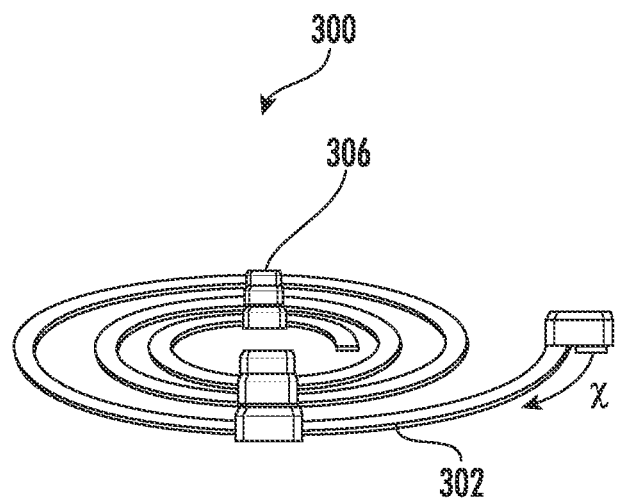
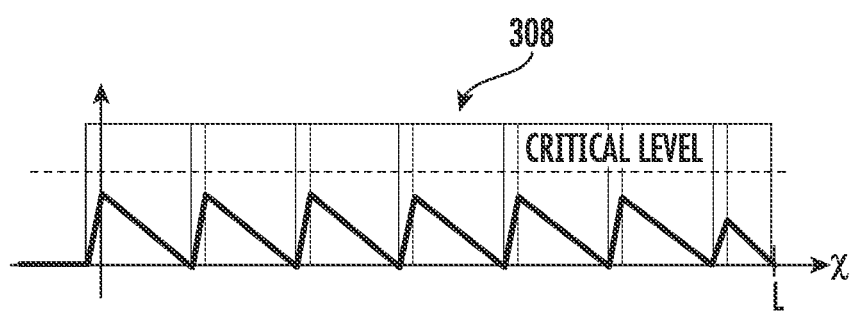
FIG. 3
(PRIOR ART)

SERIES SELF-RESONANT COIL STRUCTURE FOR CONDUCTING WIRELESS POWER TRANSFER

CROSS-REFERENCE TO RELATED APPLICATIONS

This application claims benefit of U.S. Provisional Patent Application Ser. No. 62/639,768, filed Mar. 7, 2018, which is herein incorporated by reference in its entirety.

TECHNICAL FIELD

In accordance with some embodiments, the presently disclosed subject matter provides a coil structure for conducting near-field wireless power transfer, integrating the traditional inductor and capacitor into one single coil, and forming a series resonance.

BACKGROUND

At present, the practice of using wireless power transfer (WPT) via magnetic resonant coupling is gaining increasing popularity. Compared to the inductive WPT techniques used in commercial products today, resonant WPT can be used to transfer power over a longer distance with higher spatial freedom. Experimental prototypes have shown power transfer across an air gap comparable to the radius of the transmission coil with high efficiency, proving the viability of resonant WPT.

Despite the promises of high efficiency and long transfer distances, resonant WPT is presented with significant challenges to overcome before broad adoption occurs. One of the critical challenges is the resonant coil design. Standard WPT coils use the coil inductance and a discrete, external capacitor to form the resonance. However, the resonant voltage that is applied to the capacitor may be very high. Further, the associated high-frequency current may be problematic for lumped capacitors. While large arrays of capacitors can also reduce the voltage and current stresses of individual elements, these types of arrays can be bulky and expensive and may introduce undesirable interconnection impedance.

Another approach of building the resonance is using the parasitic electric field of the coil to resonate with the magnetic field, forming a self-resonance coil. Although a series self-resonant coil is promising to reduce system loss, current design methods of series self-resonant coils are unfortunately insufficient due to the limited inductance, prohibitively large thickness, and lack of modeling to explore the performance limit.

Thus, there currently exists a need in the art for an improved series self-resonant coil structure for conducting wireless power transfer.

SUMMARY

The subject matter described herein includes a series self-resonant coil structure for wireless power transfer that comprises a top coil element that is configured in a spiral and planar arrangement and a bottom coil element that is configured in a spiral and planar arrangement that is substantially similar to the arrangement corresponding to the top coil element, wherein the top coil element and the bottom coil element are positioned in a stacked arrangement in relation to each other. The coil structure further includes a dielectric layer element that is planarly positioned in between the top coil element and the bottom coil element, wherein the top coil element, the bottom coil element, and the dielectric layer element are aligned to produce series-resonance in the coil structure.

The subject matter described herein also includes a series self-resonant coil structure for wireless power transfer that comprises a top coil element that is configured in a spiral and planar arrangement and a bottom coil element that is configured in a spiral and planar arrangement that is substantially similar to the arrangement corresponding to the top coil element, wherein the top coil element and the bottom coil element are positioned in a stacked arrangement in relation to each other. The coil structure further includes at least one middle coil element that is configured in a spiral and planar arrangement that is substantially similar to the arrangement corresponding to each of the top coil element and bottom coil element, wherein the top coil element, the bottom coil element, and the at least one middle coil element are positioned in a stacked arrangement in relation to each other and a dielectric layer element that is planarly positioned in between each of the top coil element, the bottom coil element, and the at least one middle coil element, wherein the top coil element, the bottom coil element, the at least one middle coil element, and the dielectric layer element are aligned to produce series-resonance in the coil structure.

It is an object of the presently disclosed subject matter to provide a series self-resonant coil structure for wireless power transfer.

An object of the presently disclosed subject matter having been stated hereinabove, and which is achieved in whole or in part by the presently disclosed subject matter, other objects will become evident as the description proceeds hereinbelow.

BRIEF DESCRIPTION OF THE DRAWINGS

Preferred embodiments of the subject matter described herein will now be explained with reference to the accompanying drawings, wherein like reference numerals represent like parts, of which:

FIG. 2 is an illustration of a coil structure for wireless power transfer configured with a capacitor and a graph depicting the varying surface electric potential at the surface of the coil;

FIG. 3 is an illustration of a coil structure for wireless power transfer configured with a plurality of capacitors and a graph depicting the varying surface electric potential at the surface of the coil;

DETAILED DESCRIPTION

Figure 1:
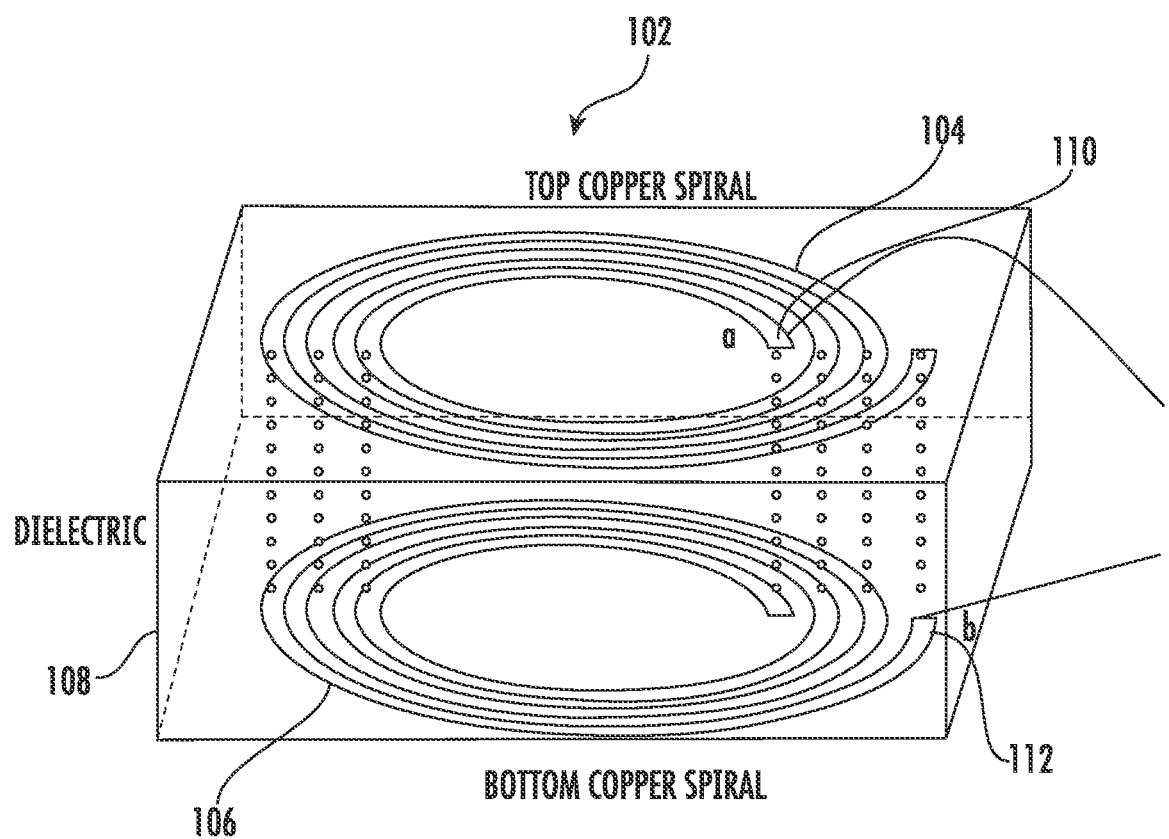
FIG. 1 is a diagram illustrating an exemplary structure of a series self-resonant coil structure for wireless power transfer according to an embodiment of the subject matter described herein.

The presently disclosed subject matter will now be described more fully. The presently disclosed subject matter can, however, be embodied in different forms and should not be construed as limited to the embodiments set forth herein below and in the accompanying Examples. Rather, these embodiments are provided so that this disclosure will be thorough and complete, and will fully convey the scope of the embodiments to those skilled in the art.

In accordance with some embodiments, the presently disclosed subject matter provides a coil structure for near-field wireless power transfer, integrating the traditional inductor and capacitor into one single coil structure and forming a series resonance. Notably, the presently disclosed self-resonant coil is series resonant, while previous reported coils are parallel resonant. The series resonant character makes the disclosed coil structure ideal for near-field wireless power transfer applications. By operating as an integrated capacitor, the cost and space of a resonant capacitor implemented by a self-resonant coil structure can be significantly reduced. Further, the inherent distributed structure of the series self-resonant coil enables the structure to carry more power than a lumped structure. In addition, the electric field strength near the surface of the disclosed coil is notably smaller as compared to a traditional coil. Other benefits as discussed further below include design convenience, accuracy, and easy fabrication using printed circuit board (PCB) technology.

For consumer electronics, wireless power transfer (WPT) represents the penultimate transition away from wired technology. Although the commercialization of WPT technologies represents a paradigm shift, there are key technological issues which have yet to be solved in order to capitalize on the potential market. One key challenge facing WPT adoption is adherence to Electromagnetic Interference (EMI). Although competing approaches exist, the only commercialized approach to wireless power transfer is inductive WPT. Inductive WPT uses the magnetic coupling between two proximate and/or adjacent coils of wire to transfer electrical power from a transmitter to a receiver without a direct/wired electrical connection. In any WPT system, the coils are the source of three types of energy fields: magnetic fields, electric fields, and radiated electromagnetic (EM) fields. Notably, the magnetic field is used for actual power transfer. Because the coils are coupled, the magnetic field is confined with only a small amount of stray field outside of the space existing between the transmitter and receiver coils. Electric fields and EM fields are parasitic and are not used to transfer power, but are instead a necessary consequence caused by the generation of the magnetic field. The radiated EM field results from high frequency antenna characteristics of the transmitter coil and can be mitigated through standard filtering techniques. The electric field, however, cannot be avoided in traditional designs. Though the electric field itself does not present a safety hazard at power levels employed in consumer applications, it represents a signal disturbance which has been shown to cause erroneous behavior in sensitive electronic components (e.g., touch screens on cell phones, track pads on laptops, etc.) and may present a shock hazard when translated into a voltage on these elements. Shielding, filtering, or other standard techniques for electric field mitigation cannot be used in these types of applications as the electric field results from the coil voltage, which is necessary to induct the magnetic field used to conduct WPT.

The disclosed subject matter presents a novel coil design for wireless power transfer applications that has reduced component count, improved efficiency, and inherently minimized electric field generation. FIG. 1 is a diagram illustrating an exemplary structure of a series self-resonant coil structure for wireless power transfer according to an embodiment of the subject matter described herein. Specifically, FIG. 1 shows an exploded view of the proposed coil structure 102. Coil structure 102 comprises two substantially similar (or, in some embodiments, identical) planar spiral coil elements 104-106 separated by one layer of dielectric layer element 108. The two coil elements 104-106 may comprise copper spirals (e.g., a copper spiral trace) that are designed to achieve the resonant inductance and inserted dielectric layer element 108 helps form a parallel-plate capacitor between the two copper layers (e.g., coil elements 104-106) while fixing their position. In some embodiments, top coil element 104 is configured in a spiral and planar arrangement and bottom coil element 106 is configured in a similar spiral and planar arrangement that is substantially similar (or, alternatively, identical) to the arrangement corresponding to top coil element 104. Notably, top coil element 104 and bottom coil element 106 are positioned in a stacked arrangement in relation to each other. Further, dielectric layer element 108 is planarly positioned in between top coil element 104 and the bottom coil element 106 such that all the elements are positioned and/or aligned to produce series-resonance in coil structure 102. When configured in this stacked configuration or manner, there is no air gap between the three layers.

As depicted in FIG. 1, terminal "a" 110 and terminal "b" 112 may be connected to an AC source (e.g., voltage source inverter) while the remaining two terminals are left open.

Due to the complete separation of the two conduction layers (e.g., coil elements 104-106) by the dielectric layer element 108, coil structure 102 is an open circuit for a DC source. When an AC source is applied, a current flows from one terminal to the other crossing through the dielectric layer element in a distributed gradient throughout the length of the coil structure 102. Though current is distributed over the length of the coil, every current path between the terminals traverses the entirety of the spiral once and crosses the dielectric layer element 108 once, resulting in a series LC impedance.

Similar to a parallel-plate capacitor, the current transients between two coil elements 104-106 in the form of displacement current $J_d = \varepsilon_r \varepsilon_0 \delta E/\delta t$ where $\varepsilon_r$ is the relative permittivity of the dielectric material. The uniform distribution of the electric field, leads to the uniform distribution of $J_d$ along the whole length and width of the coil in the dielectric layer element 108. Due to the uniform $J_d$, the input current transitions linearly from the input terminal a 110 on the top coil element 104 to the output terminal b 112 on the bottom coil element 106 over the length of the coil structure 102. At the terminals a and b, the entire coil current flows through one of the spiral conductors, with no current in the opposite conductor.

In order to examine the performance capabilities of coil structure 102, models for the inductance, capacitance, and resistance are developed based on results from research and FEA-assisted simulation. As described herein, L is analyzed based on magnetic field simulation, C is analyzed based on electric field simulation, and R is analyzed based on current distribution.

Inductance Analysis

The top and bottom coil elements 104-106 of the disclosed coil structure 102 have identical current flow directions (i.e. from input terminal 110 towards output terminal 112). Compared to a single spiral coil, the current flow in coil structure 102 differs only in that it crosses vertically through dielectric layer element 108 (i.e. in the plane of the page in FIG. 1). Both coil elements 104-106 have identical current flow direction. When the dielectric thickness is thin relative to the width w, the magnetic flux distribution of self-resonant coil structure 102 and the traditional single layer spiral coil are nearly identical. Therefore the two coil structures have the same inductance. In some embodiments, the inductance of a planar spiral coil is:

$$L_{spirtal} = \frac{\mu n^2 d_{avg}}{2}\left(\ln\frac{2.46}{k_u} + 0.2 k_u^2\right)$$

where $\mu$ is the magnetic permeability, $d_{avg}$ is the average diameter $$d_{avg} = \frac{(d_o + d_i)}{2}, k_u = (d_o - d_i)/(d_o + d_i).$$

This expression exhibits a typical error of 3% when compared to FEA analysis. Therefore, the inductance equation for the proposed coil is:

$$L_s = \frac{\mu n^2 (d_i + d_o)}{4}\left(\ln\frac{2.46(d_i + d_o)}{d_o - di} + 0.2\left(\frac{d_o - d_i}{d_o + d_i}\right)^2\right)$$

Capacitance Analysis

Figure 6:
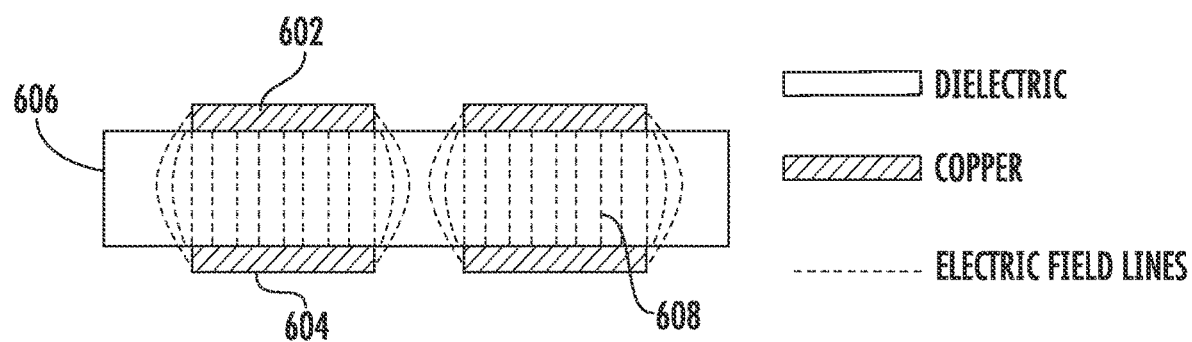
FIG. 6 is a diagram of an cross-section of an exemplary series self-resonant coil structure for wireless power transfer that depicts the electric field exhibited by the series self-resonant coil according to an embodiment of the subject matter described herein.

FIG. 6 is a diagram of a cross-section of an exemplary series self-resonant coil structure for wireless power transfer that depicts the electric field exhibited by the series self-resonant coil according to an embodiment of the subject matter described herein. The electric field of the depicted coil structure is similar to a parallel plate capacitor. The E-field is composed of two parts: i) the primary electric field located vertically between the two conductor layers 602-604 and inside the dielectric layer 606 and ii) the fringing field located between adjacent conductors. FIG. 6 shows the electric field 608 of the double layer planar coil structure for an example geometry. The related capacitance has been summarized via various calculation formulae and verified them with simulation results, proposing an accurate model of the capacitance with less than 5% error:

$$C_s = \frac{\varepsilon_r \varepsilon_0 \pi w n (d_i + d_o)}{2h}\left[1 + \frac{h}{\pi w}\ln\frac{2h}{\pi w} + \frac{h}{\pi w}\ln\left(1 + \frac{2h}{\pi w} + 2\sqrt{\frac{t}{h} + \left(\frac{t}{h}\right)^2}\right)\right]$$

where $l_0 = \pi n(d_o + d_i)/2$ is the total length of one spiral copper coil element (e.g., spiral copper trace layer).

Resistance Analysis

The total loss of the self-resonant coil structure 102 comprises copper loss and dielectric loss, where the copper loss is modeled as skin-effect loss plus proximity effect loss. The skin effect loss can be calculated through the integration of the loss density over the whole coil. The proximity loss is through the calculation of the proximity field on each turn and the calculation of the proximity loss afterwards.

As mentioned above, the input current transitions linearly from the top to bottom coil elements 104-106 over the whole length of the coil structure 102. At the terminals, the entire coil current flows through one of the spiral conductors, with zero current in the opposite conductor. The bottom coil element 106 collects displacement current from top coil element 104:

$$I_{bot}(l) = \int_0^l J_d w \, dl = \frac{l}{l_0} I_{in}$$

The top coil element 104 transfers current to bottom coil element 106 while both sides add up to Iin:

$$I_{top}(l) = I_{in} - I_{bot}(l) = \left(1 - \frac{l}{l_0}\right) I_{in}$$

Due to the skin effect, the current inside the copper coil increases towards the dielectric layer. The skin effect resistance, or effective series resistance (ESR), present in the coil structure when conducting $I_{in}$ is:

$$R_{skin} = \frac{1}{I_{in}^2}\int_0^{l_0}\left(I_{top}(l)^2 + I_{bot}(l)^2\right)\frac{\rho_{copper}}{w\delta}dl$$

$$= \frac{2\rho_{copper}\pi n(d_i + w + n \cdot s)}{3 w \delta}$$

where $\rho_{copper}$ is the copper resistivity and $\delta$ is the skin depth $$\delta = \sqrt{\frac{\rho_{copper}}{\pi \mu_0 \omega_s}}$$

where $\mu_0$ is the vacuum permeability and $\omega_s$ is the angular switching frequency. In addition to skin effect, the time-varying H-field around the coil causes the eddy current loss in the copper foil. Since the H-field in the self-resonant coil has an almost identical H-field to a single spiral, the H-field and proximity ESR calculation of the conventional coil are applied to the resonant coil proximity ESR. As such, the spiral shape is simplified to multiple concentric rings.

$H_c$ is the H-field strength at the center point. $H_{in}$ is the H-field strength at the innermost point. $H_{out}$ is H-field strength at the outermost point. The decrease in H-field strength on each turn is $dH=(H_{in}-H_{out})/n$. The radial magnetic field is $H_e=(l_{in}-dH*h)/(2*w)$. Using H-field calculation of the spiral coil:

$$H_c = \frac{nI_{in}}{(d_o - d_i)} \ln \frac{\sqrt{d_o^2 + t^2} + d_o}{\sqrt{d_i^2 + h^2} + d_i}$$

$$H_{in} = H_c \exp^{\frac{d_i}{d_o}\left(0.4 + 0.15 \ln \frac{d_o}{4t + 2h}\right)}$$

$$H_{out} = -H_c \left(0.4 + 0.08 \ln \frac{d_o}{4t + 2h}\right) \exp^{\frac{d_i}{d_o}\left(1 + 0.125 \ln \frac{d_o}{4t + 2h}\right)}$$

For the ith turn with an inner radius $$r_{i,i} = \frac{d_i}{2} + (w + s)(i - 1)$$

and an outer radius $r_{o,i} = r_{i,i} + w$, Hl(i) is denoted as the H-field strength at the left side of the coil structure and Hr(i) is the H-field strength at the right side of the coil structure. The resonant coil proximity effect loss can be calculated as:

$$R_{prox} = \sum_{i=1}^{n} \frac{wh}{(2\alpha w + h)^2} \cdot \left[hk \cdot \coth(kw) + \right.$$
$$\left. 2kw\alpha^2 \cdot \coth\left(\frac{hk}{2}\right) + 4\alpha + 2hk \cdot \tan\left(\frac{kw}{2}\right)(\beta + 1 - i)(\beta - i)\right] \cdot R_{dc,i}$$

where $k=(1+j)/\delta$ is the complex propagation constant $\alpha = H_e/dH$, $\beta = H_{in}/dH$, and $$R_{dc,i} = \rho_{copper} \pi \left[d_i + \frac{(d_o - d_i)}{n} * i\right] \bigg/ (wt).$$

The dielectric loss is calculated based on the loss tangent $D_k$ of the dielectric material:

$$R_c = \frac{D_k}{2\pi f C_s}$$

Finally, the coil total ESR is $R_s = R_{skin} + R_{prox} + R_e$.

FIG. 2 is an illustration of a coil structure for wireless power transfer configured with a capacitor and a graph depicting the varying surface electric potential at the surface of the coil. Specifically, FIG. 2 shows a traditional WPT coil design and its electric potential at the surface. The coil 200 comprises a spiral conductor 202 with a series capacitor 204. As a voltage is applied to the coil, a potential is developed on the surface of the coil 200, and gradually drops along its length. The potential rises within the capacitor 204 to its peak, then gradually drops along the length of the coil. The large field within the capacitor is not problematic, as it is internal to the package. The potential along the coil, however, must be exposed and unshielded to allow the coil to be used for wireless power transfer. The dashed line in graph 208 indicates the electric field magnitude at which either (i) the system presents a shock hazard or (ii) the system presents an intolerable electrical disturbance to any consumer electronics being charged: (whichever is lower). The traditional coil surpasses this critical level, thus failing consumer acceptability. This phenomenon has been observed in practice and addressed through the design presented in FIG. 3. FIG. 3 illustrates a coil configuration in which the traditional coil's single capacitor is distributed throughout the coil 300 to limit the peak amplitude of the field. As shown in graph 308, coil 300 is able to limit the electric field potential to levels below the critical level indicated by the dashed line, but increases the cost, size, and complexity of the coil, making it difficult to integrate into highly-compact consumer electronics, where space is at a premium. Further, the full current of the spiral conductor 302 of coil 300 must now flow through many series capacitors 306, rather than one in the traditional case, resulting in an increase in power loss or, equivalently, a decrease in efficiency.

To address these deficiencies, a new series self-resonant coil structure is disclosed. For example, coil structure 102 in FIG. 1 uses two layers of identical spiral coil elements 104-106, with a dielectric layer element 108 positioned in between the coil elements. Coil structure 102 effectively integrates a distributed capacitor all along the coil structure. The result is that the external electric field of coil structure 102 is largely eliminated. Similar to the capacitor utilized in the traditional structure that contains a large electric field internally, the disclosed coil structure confines the electric field within the two coil elements 104-106, where the field is inaccessible for a shock hazard and electrically isolated to prevent any electrical disturbance to the device(s) being charged. Further, because of the distributed nature of the capacitor, any segment of the coil is subjected to only a small displacement current, thereby eliminating the additional losses that were experienced by each capacitor 306 of the coil 300 shown in FIG. 3 when conducting the full coil current.

Figure 4:
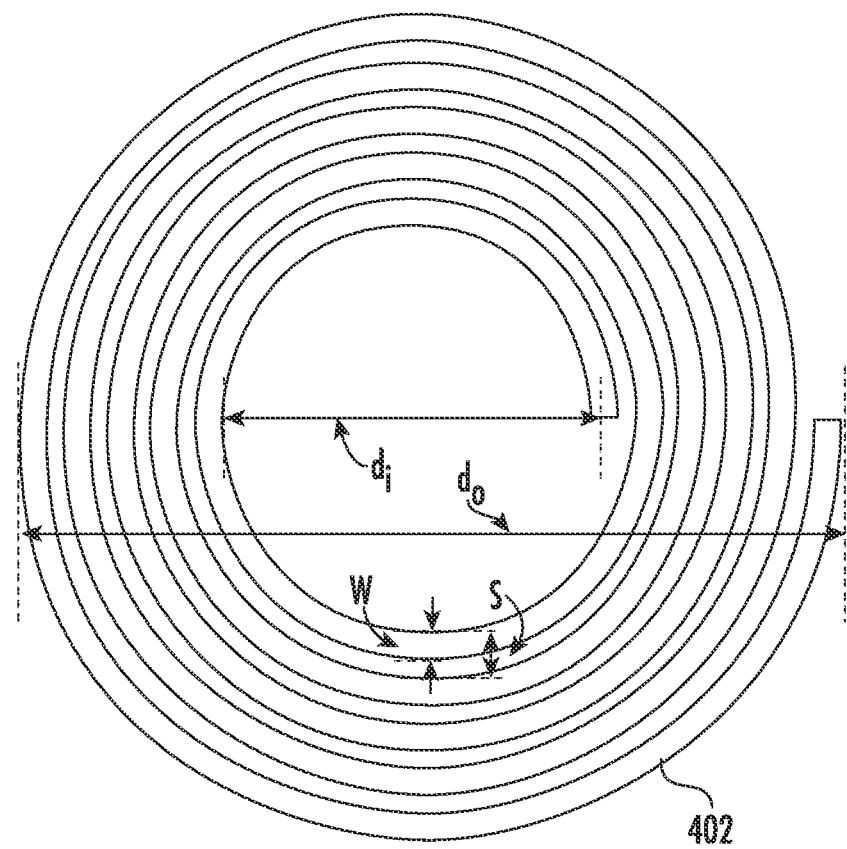
FIG. 4 is a diagram of the geometric parameters and exemplary shape of a series self-resonant coil structure for wireless power transfer according to an embodiment of the subject matter described herein.

In some embodiments, exemplary geometric parameters of a spiral track of disclosed coil structure 102 depicted in FIG. 1 are shown in FIG. 4. In particular, example coil trace 402 w is the width of each turn, s is the distance from the inner radius of one turn to the inner radius of the adjacent turn, $d_i$ is the inner radius, and $d_o$ is the outer radius. Additionally, n is the number of turns in the spiral and h is the thickness of the dielectric layer.

Multilayer Coil Structure

As described above, FIG. 1 depicts the coil structure 102 and copper trace dimensions of a two-layer self-resonant coil. For both the top coil element 104 and the bottom coil element 106, the copper coil width is w and $l_0$ is the total length of copper coil trace. From one terminal end of the copper coil trace on top layer (i.e., terminal a 104), the current transfers gradually to the copper coil trace of bottom coil element 106 on the other end (i.e., terminal b 112) in the form of a displacement current. The coil structure 102 functions as a one series L-C resonant network. Notably, the capacitance is formed similar to a parallel plate capacitor positioned between the overlapped copper trace areas of the top coil element 104 and the bottom coil element 106. Due to the uniform copper width along the copper trace, the unit capacitance per length along the coil structure 102 remains constant. As such, the current on top coil element 104 will be decreasing linearly and transferred to bottom coil element 106. Consequently, current on bottom coil element 106 will increase linearly since the sum of the total current is constant along the copper coil element along the length $l_0$ of coil structure 102.

Figure 5:
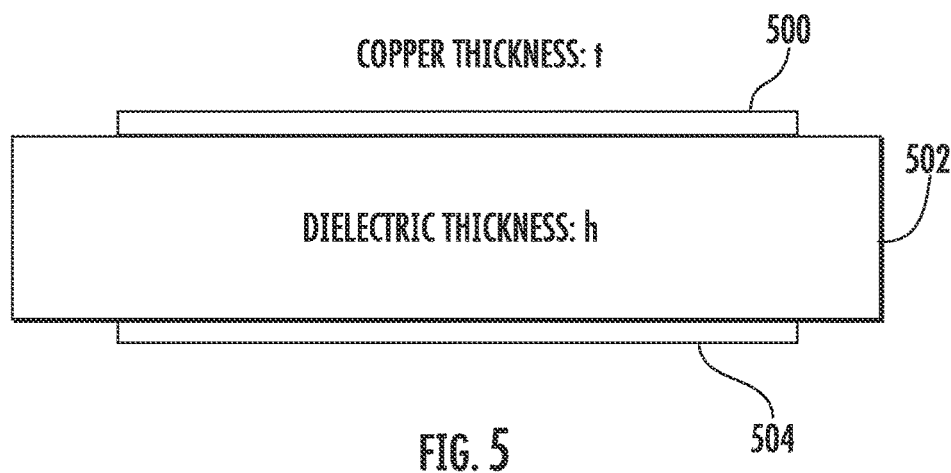
FIG. 5 is a diagram of an cross-section of an exemplary series self-resonant coil structure for wireless power transfer according to an embodiment of the subject matter described herein.

In order to reduce the coil element ESR and increase the quality factor of coil structure 102, some embodiments are configured such that the copper coil width w is increased. However, for a two-layer coil structure, the copper width cannot be changed arbitrarily. Notably, the capacitance value is largely determined by the copper coil element width w, with a given copper trace thickness t, and a dielectric material thickness h (e.g., as shown in FIG. 5, which depicts top copper trace layer 500, bottom copper trace layer 504, and dielectric material layer 502). In addition, considering the restricted coil pad diameter, the maximum available width for the coil element is often limited, with a certain number of spiral turns N demanded by the inductance value. Consequently, the reduction of the ESR in a two-layer self-resonant coil is inherently limited by the designed inductance and capacitance values.

Figure 7:
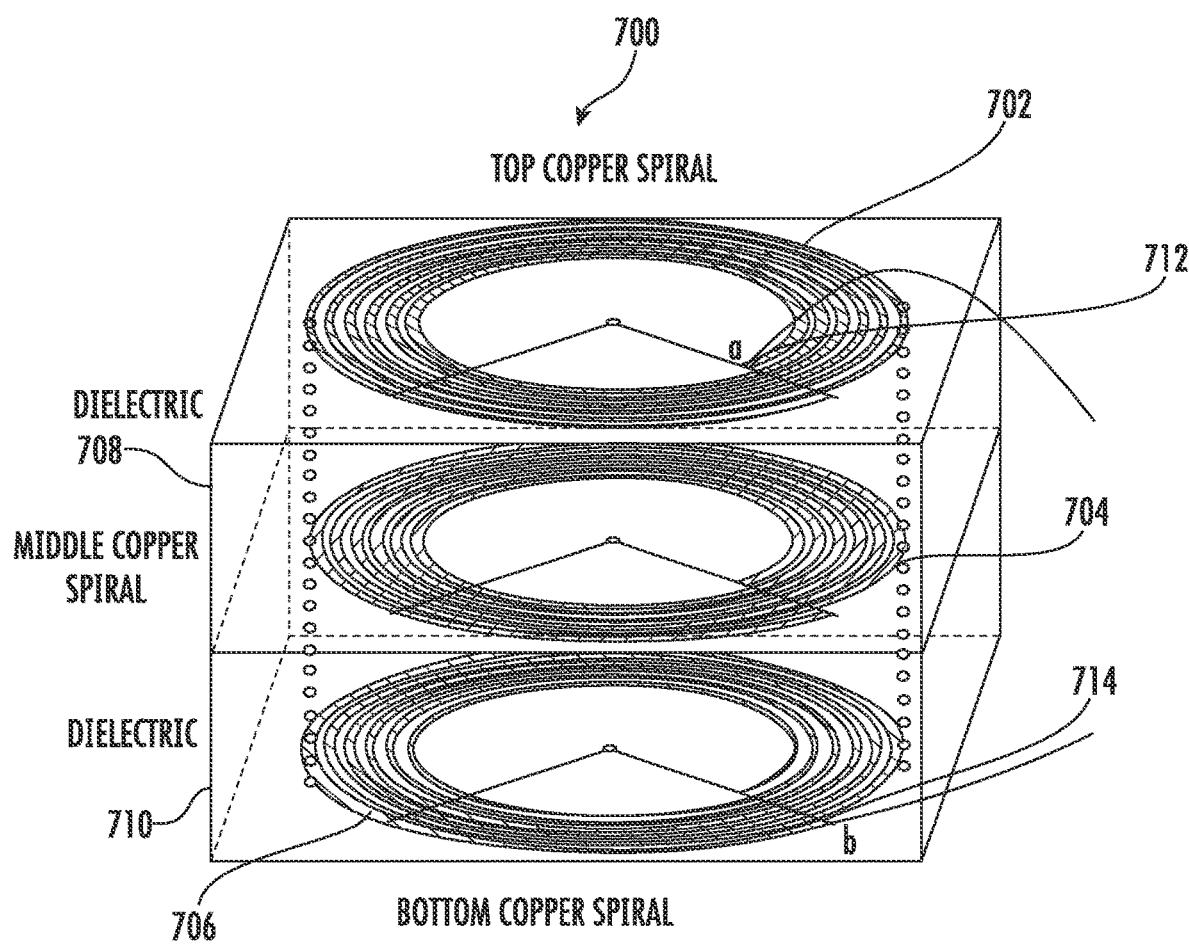
FIG. 7 is diagram illustrating an exemplary structure of a multi-layered series self-resonant coil structure for wireless power transfer according to an embodiment of the subject matter described herein.

In an attempt to increase the copper area with the given capacitance value constraint, the disclosed subject matter can also be adapted to configure a multi-layer non-uniform self-resonant coil structure. For example, FIG. 7 illustrates a three-layer series self-resonant coil structure 700. As shown in FIG. 7, three layers of copper spirals (e.g., three coil elements 702, 704, 706) are stacked in a concentric and planar arrangement. In addition, two layers of dielectric material (e.g., dielectric layers 708-710) are planarly positioned in between the three coil elements 702-706 forming a stack. Similar to two-layer series self-resonant coil embodiments, a current will gradually flow from terminal a 712 (e.g., an interior terminal end) at the very top layer (e.g., top coil element 702) to the terminal b 714 (e.g., an outer terminal end) at the bottom layer (e.g., bottom coil element 706) via the middle layer (e.g., middle coil element 704). In some embodiments, terminal a 712 and terminal b 714 may be respectively connected to the positive terminal and negative terminal of an alternating current (AC) power source, such as a voltage source inverter. Notably, the two capacitors formed between the adjacent copper layers are connected in series. Along with the inductance from spiral coil elements, three-layer coil structure 700 still functions as a series L-C resonant network. As such, the total capacitance value for self-resonant coil structure 700 is significantly reduced due to the arrangement of the two capacitors in series. Such an arrangement leads to a wider copper trace width and a potentially lower copper equivalent ESR.

Figure 8:
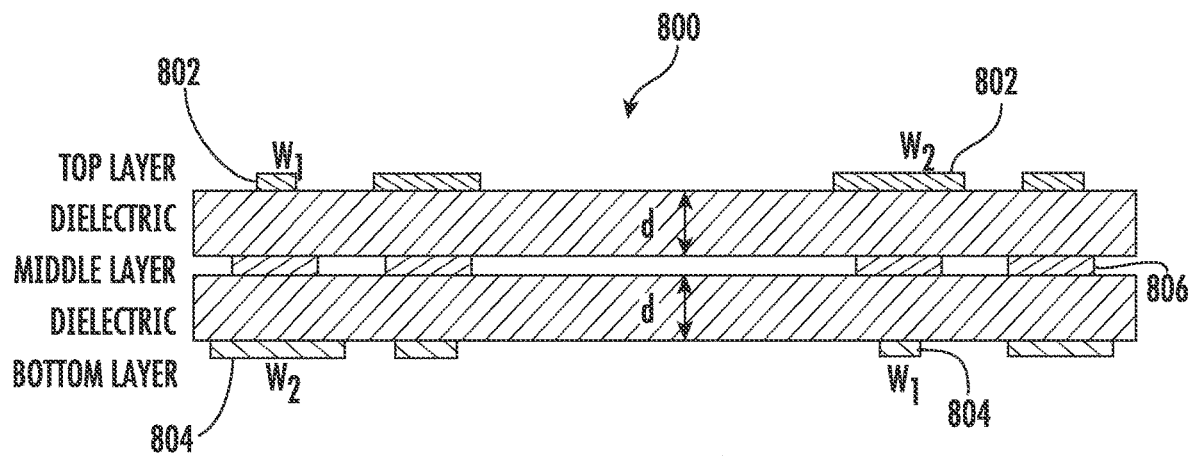
FIG. 8 is a diagram of an cross-section of an exemplary multi-layered series self-resonant coil structure for wireless power transfer according to an embodiment of the subject matter described herein.
Figure 9:
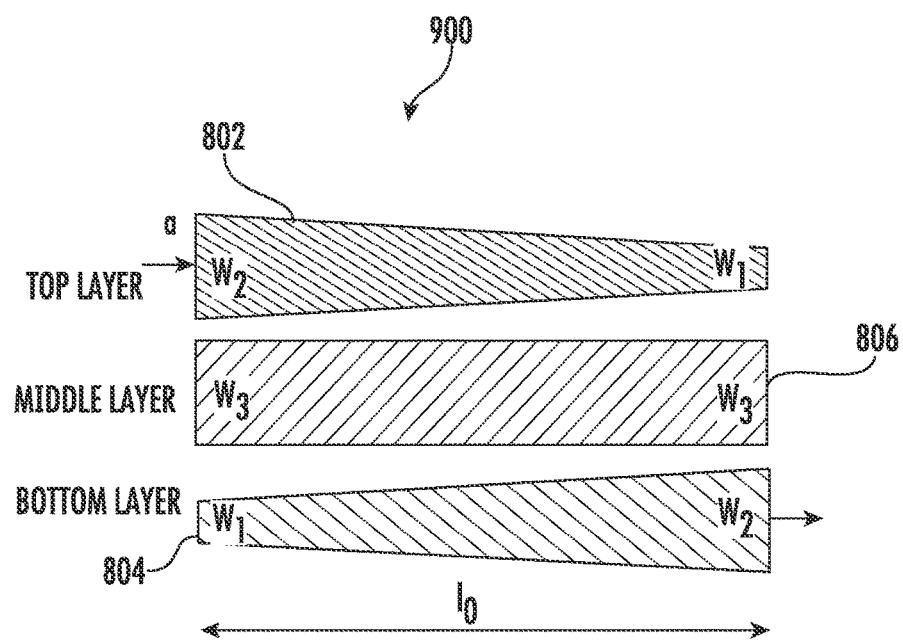
FIG. 9 is a top view of stretched copper traces of a three-layer non-uniform self-resonant coil structure according to an embodiment of the subject matter described herein.

Moreover, the total current $I_0$ can now can be shared among the three copper layers (e.g., three coil elements 702-706), which also improves of coil quality factor. To ensure that current can be shared more equally among all layers of coil structure 700, the geometry of each of the traces of three coil elements 702-706 should be modified to a non-uniform width. As shown in FIG. 8, the width of the top coil element 802 (e.g., top copper layer) of a 3 layered coil structure 800 linearly decreases from $w_2$ to $w_1$. Likewise, the width of the bottom coil element 804 is linearly increasing from $w_1$ to $w_2$. The width of the middle coil element 806 is $w_3$ (as also depicted in the top down view 900 presented in FIG. 9). Traversing the copper trace length $l_0$, the unit capacitance per length is dependent on the varying of the width of the copper element. For instance, the capacitance between top coil element 802 and middle coil element 806 is decreasing with the reduction of the copper coil element width from $w_2$ at terminal a to $w_1$ at the other end. As a result, the current transfer rate from top coil element 802 to middle coil element 806 is decreasing along the copper trace.

Figure 10:
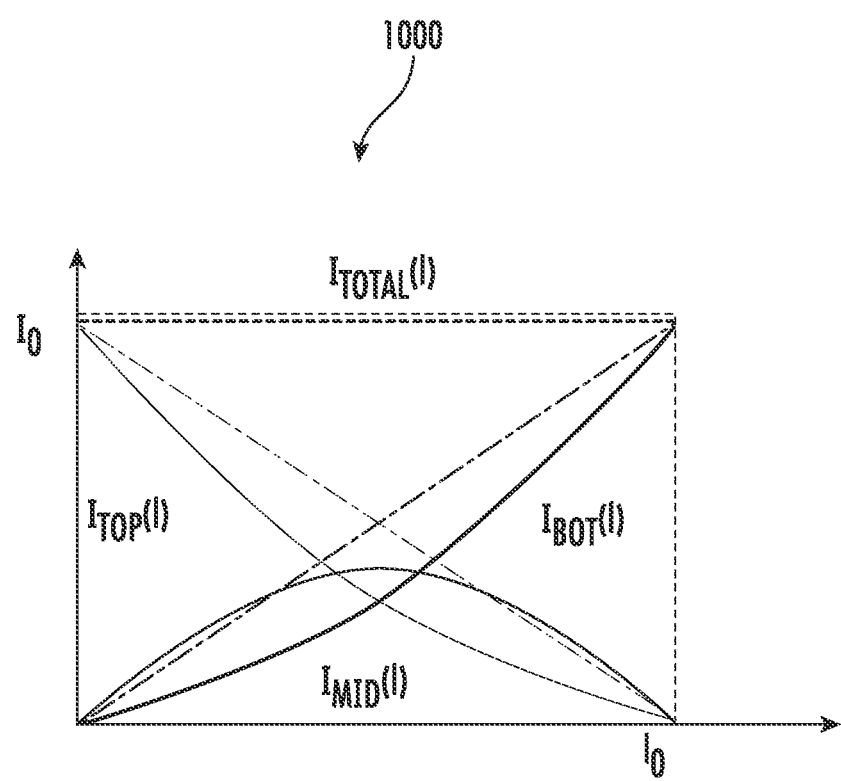
FIG. 10 is a current distribution along the copper trace of a three-layer non-uniform self-resonant coil structure according to an embodiment of the subject matter described herein.

As shown in graph 1000 of FIG. 10 that illustrates the coil structure current distribution, the current on the top coil element (e.g., element 802 shown in FIG. 8) decreases exponentially. Similarly, due the symmetric geometry of bottom coil element, the current on the bottom coil layer (e.g., element 804 shown in FIG. 8) increases in the same exponential manner. Because total current is constant, the middle coil element (e.g., element 806 shown in FIG. 8) will carry the remaining current. Namely, the total current will be shared among the three coil elements due to the different current transfer rates existing among the three layers, which are controlled by the non-uniform copper width. In one alternate embodiment, all three layers have the same copper width w and the current transferred to the middle coil element from top coil element at any specific position along the copper trace will be instantaneously transferred to the bottom layer. As such, the middle coil element would not be utilized for current sharing in this particular embodiment.

In addition to reducing the total capacitance and affording current sharing among the three layers, a third benefit of using a non-uniform copper width for the series self-resonant coil structure is that a majority of the current will flow on the copper trace (e.g., coil element) with the largest width, which further reduces equivalent ESR. Notably, the series self-resonant coil functionality will remain intact even if the middle coil element is removed. A two-layer non-uniform coil is just one particular embodiment of a two-layer series self-resonant coil that exhibits superior current distribution.

In some embodiments, the three-layer non-uniform series self-resonant coil may be constructed with a 6.78 Megahertz (MHz) high frequency power stage utilizing Gallium Nitride (GaN) switches. A coil element prototype with a 100 mm radius is fabricated using 1.52 millimeter (mm) ceramic-filled PTFE laminate RO3003 with 1 ounce (oz) copper cladding. To etch the spiral coil pattern on the copper cladding, bond tape can be used to cover and protect the spiral pattern. A 40 watt low power laser cutter can be used to remove the unwanted bond tape for the subsequent acid etching. Before testing, the completed coil element structure can be cleaned with isopropyl alcohol and deionized water, followed by one hour in a 150° C. heat chamber. In one embodiment, the coil element structure comprises copper traces of widths including $w_1$=0.1 mm, $w_2$=4.9 mm, $w_3$=4.9 mm. Further, the coil element structure may have turns number N=5 and an inner radius, $r_i$=61.93 mm. Analysis has shown that such a coil element is resonant at 6.47 MHz with a measured inductance of 6.5 microhenries (uH) and a measured capacitance of 93 picofarads (pF), which are both less than 10% error from the theoretical calculation. The fabricated coil ESR is approximately 1.2 ohms ($\Omega$), or 220 in quality factor, which is almost doubled in comparison to a 2-layer uniform width self-resonant coil.

Figure 11:
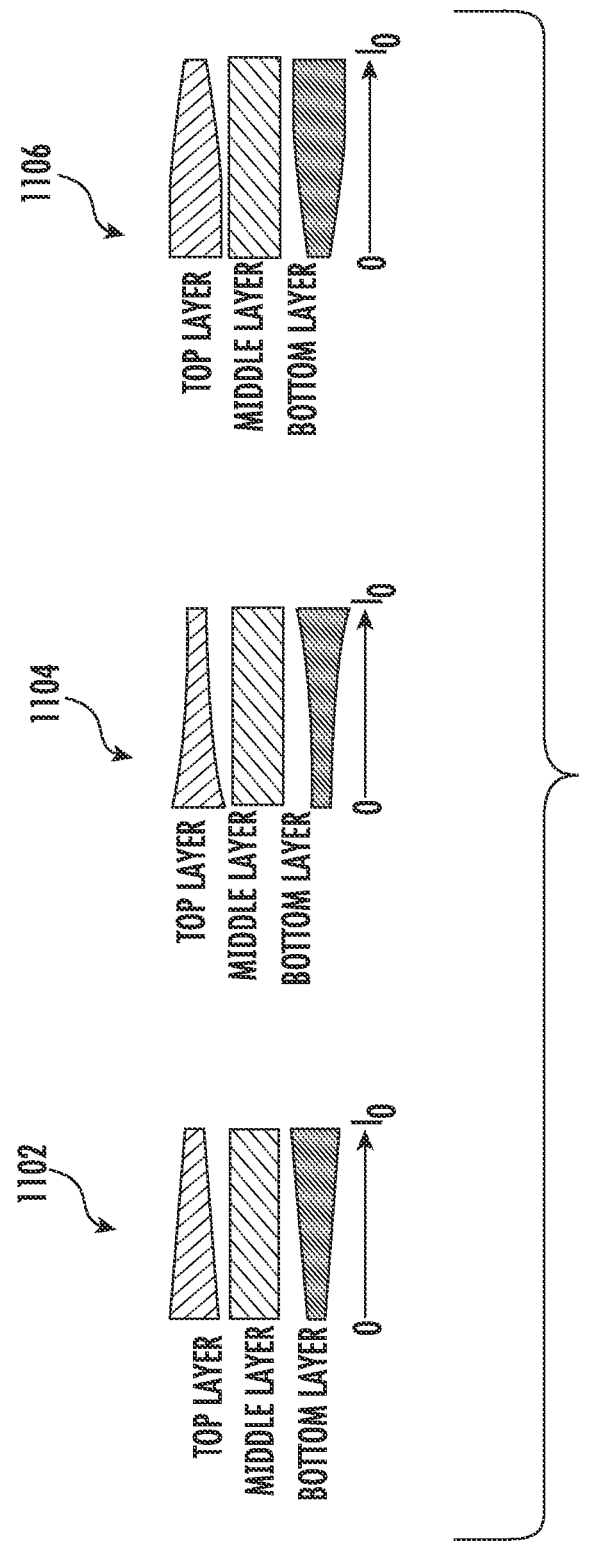
FIG. 11 is a top view of stretched copper traces for three-layer non-uniform self-resonant coil structures according to an embodiment of the subject matter described herein.

In order to achieve more balanced current sharing among the three coil elements of the coil structure, the coil elements may have a larger ratio of $w_2$ over $w_1$. However, the ability to increase the coil width ratio is largely limited by the coil pad size and the fabrication capability. In some alternate embodiments, the geometry of the non-uniform copper widths corresponding to each of the top coil element and bottom coil element are manipulated. Instead of only linearly varying the copper width, the shape of the coil element can be varied in either a concave or convex manner. For example, FIG. 11 is a top view of stretched copper traces for three-layer (top layer, middle layer, bottom layer) non-uniform self-resonant coil structures according to an embodiment of the subject matter described herein. More specifically, FIG. 11 illustrates a copper trace geometry for a linear varying coil width 1102, a copper trace geometry for a concave varying coil width 1104, and a copper trace geometry for a convex varying width 1106. For a given required capacitance, the coil can be designed with any of the three geometries illustrated in FIG. 11.

The three candidates can be compared by the current distribution analysis. For the simplicity of the analysis, the fringing field capacitance of the parallel plate capacitor is neglected, and the capacitance is approximately proportional to the overlap copper width. Under these conditions and with different and varying rates of the copper coil width along the trace from 0 to $l_0$, the distributed capacitance distribution between any two adjacent layers is found to be different and the current distribution among the three coil elements varies.

In the linear varying width case, the displacement current between top coil element and middle coil element through the dielectric layer is decreasing linearly, which is proportional to the linearly decreasing overlapped copper coil element width. In contrast, the current transfer rate in the concave case decreases exponentially, which is proportional to the concave overlapped copper width between the top coil element and middle coil element. With the differing current transfer rates as depicted in the current distribution among the three copper traces varies for top coil element, the middle coil element, and the bottom coil element, respectively. In the concave embodiment, more current will be allocated to the middle coil element, which enables improved current sharing among the three coil elements and reduces equivalent copper ESR of the coil structure.

Figure 12:
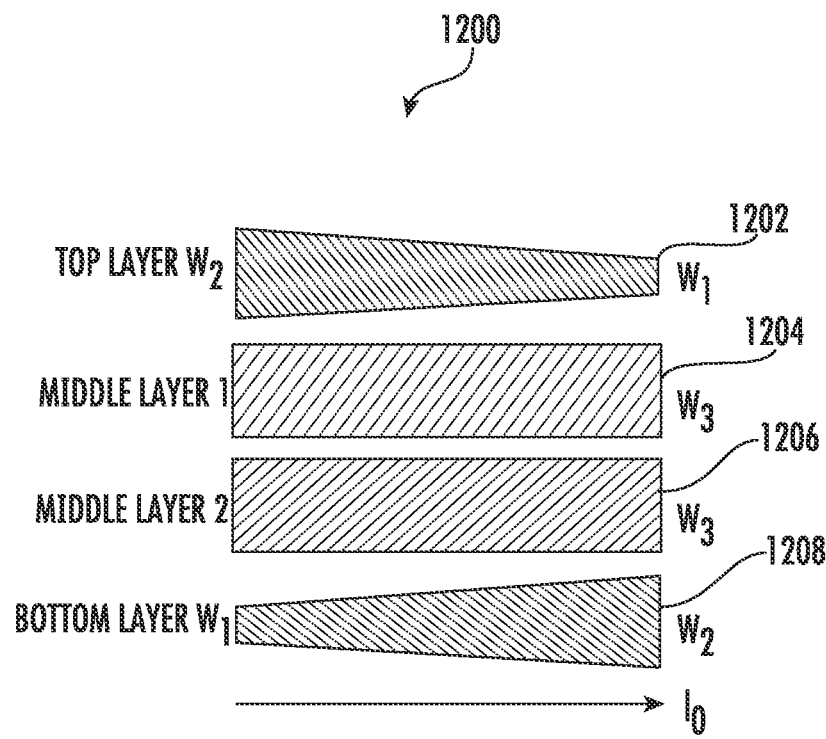
FIG. 12 is a top view of stretched copper traces for a four-layer non-uniform self-resonant coil structure according to an embodiment of the subject matter described herein.

In some embodiments, the concept of three-layer non-uniform self-resonant coil can be extended to greater number of multiple layers (i.e., more than three layers or coil elements). With additional middle layers, it is possible that the total current can be shared in a more distributed way. Further, with more capacitors equivalently connected in series, the copper width in all the coil elements/layers can be increased correspondingly. In coil structure 1200 shown in FIG. 12, each of the top coil element 1202 and the bottom coil element 1208 has a non-uniform copper width, thereby controlling the current transfer rate among layers. The two middle coil elements 1204, 1206 share the current such that the copper equivalent ESR is further reduced. However, it should be noted that if the middle coil element with a uniform width $w_3$ are applied, only two middle layers are allowed in the coil structure. For other embodiments that include three or more middle layers, the inner middle layers carry no current. Notably, the two middle layers adjacent to the top coil element and bottom coil element are effectively utilized for current sharing. As such, the potential of current sharing for a coil structure with a plurality of uniform middle layers may be limited.

Figure 13:
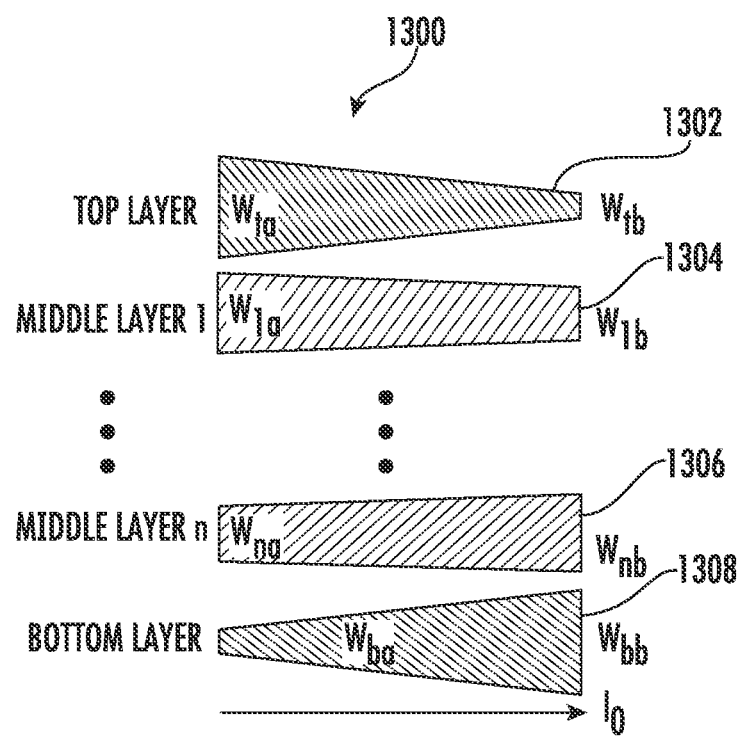
FIG. 13 is a top view of stretched copper traces for a multi-layer non-uniform self-resonant coil structure according to an embodiment of the subject matter described herein.

If the embodiment comprises a coil structure with more layers (e.g., more than four coil elements), the middle layers should be of a non-uniform copper coil width. In FIG. 13, the copper coil widths of multi-layered coil structure 1300 needs to have the following relationships in order for the current to be best shared among all of the middle layers:

$$w_{ta} > w_{1a} > \ldots > w_{na} > w_{ba}$$

$$w_{tb} < w_{1b} < \ldots < w_{nb} < w_{bb}$$

To fully utilize the multi-layer coil structure, the non-uniform width of each of the top coil element 1302 and the bottom coil element 1308 should be designed such that more current is directed/pushed into middle layers 1304, 1306. In some embodiments, the concave varying copper coil width can be applied to any multi-layer non-uniform coil structure for improved current sharing.

Figure 14:
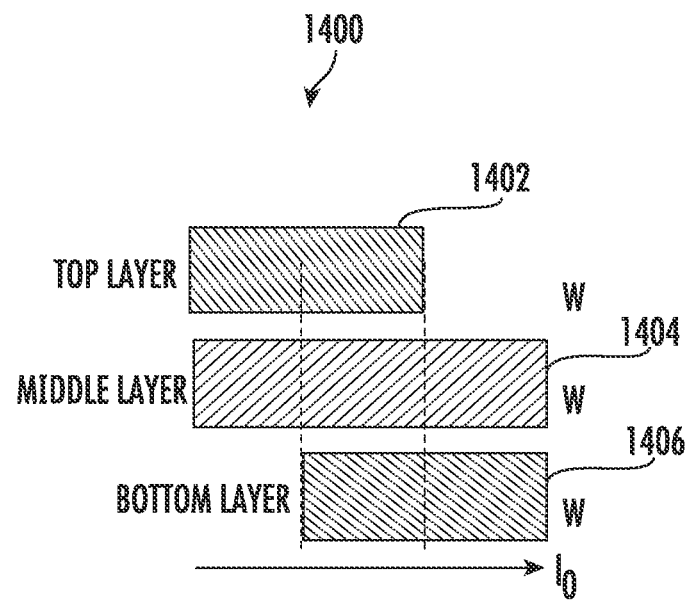
FIG. 14 is a top view of stretched copper traces for a three-layer uniform width non-equal length self-resonant coil structure according to an embodiment of the subject matter described herein.

In some embodiments, the coil structure may comprise a multi-layer "non-equal-length" self-resonant coil with series resonance. To aggressively direct more current into the middle layer(s), the length of copper coil trace can be manipulated as opposed to the width of the copper coil trace. FIG. 14 is a top view of stretched copper traces for a three-layer uniform width non-equal length self-resonant coil structure according to an embodiment of the subject matter described herein. Specifically, FIG. 14 illustrates a copper trace structure 1400 that can exhibit current sharing with three uniform width coil elements or layers. Instead of including each of a plurality of coil elements having an equal trace length, some embodiments may comprise a truncated top coil element 1402 and a truncated bottom coil element 1406 such that more current will be loaded into the middle layer 1404 (or middle coil element). Unlike a three-layer uniform copper width coil structure with each of a plurality of coil elements having an equal length $l_0$, the current can be shared in the overlapping region of the three coil elements.

Figure 15:
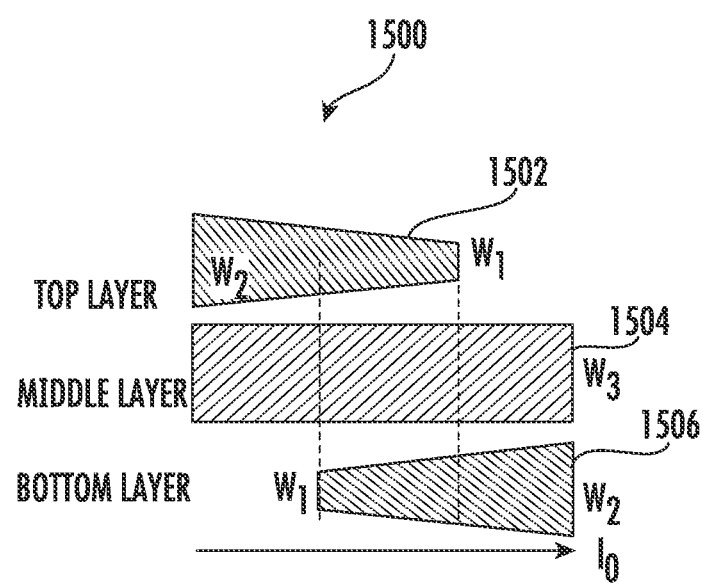
FIG. 15 is a top view of stretched copper traces for a three-layer non-uniform width non-equal length self-resonant coil structure according to an embodiment of the subject matter described herein.

In some embodiments where the coil structure is characterized by non-uniform copper coil widths, the situation is similar with truncated top and bottom layers, as shown in FIG. 15. In particular, FIG. 15 is a top view of stretched copper traces for a three-layer non-uniform width non-equal length self-resonant coil structure 1500 according to an embodiment of the subject matter described herein. Notably, more current is carried by the middle layer 1504 because of the varying widths of the top coil element 1502 and the bottom coil element 1506. Such characteristic is especially advantageous when multiple middle layers are desired. For coil structures that exhibit either the uniform or non-uniform copper coil width embodiments mentioned above, coil structures having non-equal-length coil elements for different layers can be further applied to coil structures that comprise more copper coil layers or elements (N>3).

Embodiments of the disclosed coil structure can be designed and configured in based on an optimal number of turns, n, that falls between a range defined by a minimum number of turns $(n_{min})$ and a maximum number of turns $(n_{max})$. The manner in which these values are calculated are presented below. In some embodiments, the dielectric constant $D_k$, the copper thickness $t_c$, and the dielectric thickness h are fixed for a given laminate material. Because $D_k$ is fixed, and assuming the design achieves the target capacitance $C_s = C_0$, the dielectric loss is constant, and thus the optimization goal is solely to minimize $R_{r,copper}$. The maximum outer diameter do is usually fixed due to the constrained device size in-application. Therefore, the coil design is determined by $d_i$, n and w. For desired inductance $L_0$ and capacitance $C_0$, the optimization problem is:

$$\min R_{r,copper}(d_i, n, w)$$

$$\text{s.t.} \begin{cases} L_s(d_i, n, w) = L_0 \\ C_s(d_i, n, w) = C_0 \end{cases}$$

The three design parameters $d_i$, n and w are constrained by the two equations of $L_0$ and $C_0$. Another requirement is that the n needs to be an integer. The most straightforward way of finding the optimal geometry design with lowest ESR is through iterative calculation of all possible integer values of n and selection of the lowest ESR design. To bound this iteration, the feasible range of n is examined. As such, the number of turns n is:

$$n = 2\sqrt{\frac{L_0}{\mu(d_i + d_o)\left(\ln\frac{2.46(d_i + d_o)}{d_o - d_i} + 0.2\left(\frac{d_o - d_i}{d_o + d_i}\right)^2\right)}}$$

Notably, in this equation above, only $d_i$ is a design parameter, as $d_o$ and $L_0$ are fixed by application requirements. As such, this equation is rewritten using a spiral fill factor $\alpha = d_i/d_o$, where $0 < \alpha < 1$, and normalized number of turns $n_o = n/\sqrt{L_0/d_o}$.

$$n_0 = \frac{2}{\sqrt{\mu(\alpha + 1)\left(\ln\frac{2.46(1 + \alpha)}{1 - \alpha} + 0.2\left(\frac{1 - \alpha}{1 + \alpha}\right)^2\right)}}$$

In particular, $n_0$ decreases monotonically as $\alpha$ increases. For any target $L_0$, the maximum n occurs when the inner diameter $d_i \approx 0$ or, equivalently, $\alpha = 0$. Under this condition, the previous formula simplifies to:

$$n_{max} = 2\sqrt{\frac{L_0}{\mu d_o(\ln 2.46 + 0.2)}}$$

The minimum n approaches zero when $d_i \approx d_o$. Therefore, the practical minimum number of turns, as constrained by $L_0$, is one. However, n is also constrained by the required capacitance $C_0$. As the inner diameter increases, the remaining copper area decreases until even completely filling the winding area with copper does not result in sufficient plate area to produce $C_0$.

$$d_{i,max} \approx \sqrt{d_o^2 - \frac{4hC_0}{\varepsilon\varepsilon_0\pi}}$$

which neglects fringing capacitance to simplify the expression. The largest inner diameter $d_{i,max}$ directly determines the minimum $n_{min}$. Accordingly, the minimum $n_{min}$ is calculated as:

$$n_{min} = 2\sqrt{\frac{L_0}{\mu(d_{i,max} + d_o)\left(\ln\frac{2.46}{k_{u,min}} + 0.2k_{u,min}^2\right)}}$$

Figure 16:
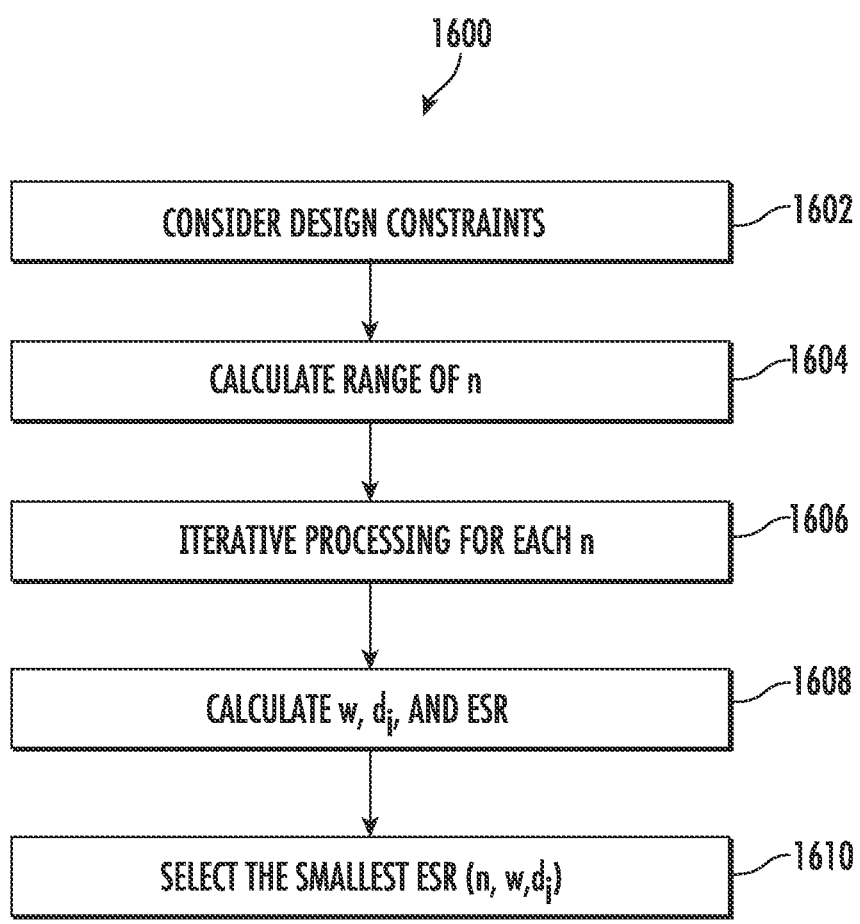
FIG. 16 is a flow chart detailing an exemplary design process for a self-resonant coil structure according to an embodiment of the subject matter described herein.

Once the range of n is known, w and $d_i$ are solved by combining the inductance and capacitance equations and the ESR is calculated for each feasible integer value $n_{min} < n < n_{max}$. The iteration design process is illustrated in FIG. 16 as a flowchart 1600. In block 1602 of flowchart 1600, a desired inductance, capacitance, maximum outer diameter, and laminate material for a coil structure can be selected (in the manner described above). In block 1604, a range for the number of turns in the coil structure is calculated by determining a maximum number of turns and a minimum number of turns for the coil structure design. In block 1606, the design process enters an iteration stage where for each value of n, the width of the coil trace, the inner diameter of the coil, and the ESR of the coil structure is determined. In some embodiments, the width of the coil trace and the inner diameter of the coil can be determined in block 1608 by solving the $L_s$ and $C_s$ design equations (e.g., as discussed above). Similarly, the ESR(n, w, $d_i$) of the coil structure can be determined in block 1608 as well by solving the $R_s$ design equation (e.g., as described above). In block 1610, the design characterized by the smallest ESR(n, w, $d_i$) for the coil structure is selected.

From intuition, the minimal n will result in the shortest conductor length. Assuming the fringing capacitance is small compared with the primary capacitance, a shorter conductor length requires a larger conductor width to achieve an equivalent conductor area and thus to maintain $C_0$. In this case, the design with the minimum number of turs $n_{min}$ will have the minimum copper loss as both shorter and wider trace reduces Rr,copper. However, in some extreme situations, e.g. when h is much larger than w and the required $C_0$ is small, the fringing field dominates the capacitance and $n_{min}$ may not minimize $R_{r,copper}$. To maintain generality, an iterative approach which considers all n within the feasible range $n_{min} < n < n_{max}$ is used for all design cases.

The embodiments disclosed herein are provided only by way of example and are not to be used in any way to limit the scope of the subject matter disclosed herein. As such, it will be understood that various details of the presently disclosed subject matter may be changed without departing from the scope of the presently disclosed subject matter. The foregoing description is for the purpose of illustration only, and not for the purpose of limitation.

What is claimed is:

1. A series self-resonant coil structure for wireless power transfer, the coil structure comprising:
a top coil element that is configured in a spiral and planar arrangement;
a bottom coil element that is configured in a spiral and planar arrangement that is substantially similar to the arrangement corresponding to the top coil element, wherein the top coil element and the bottom coil element are positioned in a stacked arrangement in relation to each other;
at least one middle coil element that is configured in a spiral and planar arrangement that is substantially similar to the arrangement corresponding to each of the top coil element and bottom coil element, wherein the top coil element, the bottom coil element, and the at least one middle coil element are positioned in a stacked arrangement in relation to each other; and
a dielectric layer element that is planarly positioned in between each of the top coil element, the bottom coil element, and the at least one middle coil element;
wherein the spirals of each of the top coil element, the bottom coil element, and the at least one middle coil element include a plurality of turns; wherein the top coil element, the bottom coil element, the at least one middle coil element, and the dielectric layer element are aligned to form a first capacitor between the top coil element and the middle coil element and a second capacitor between the middle coil element and the bottom coil element such that the first capacitor and the second capacitor are connected in series with each other and with an inductance of the coil structure, resulting in a series LC impedance, to produce series-resonance in the coil structure.

2. The coil structure of claim 1 wherein the thickness of the dielectric layer element is thin relative to the diameter of both the top coil element and the bottom coil element.

3. The coil structure of claim 1 wherein the dielectric layer element is configured in a spiral and planar arrangement that is identical to the arrangement of each of the top coil element and the bottom coil element.

4. The coil structure of claim 1 wherein each of the top coil element and the bottom coil element comprises a spiral copper trace layer.

5. The coil structure of claim 1 wherein the top coil element, the dielectric layer element, the bottom coil element, and the at least one middle coil element are arranged in a stacked configuration such that no air gap exists between any of the elements.

6. The coil structure of claim 1 wherein each of the top coil element, the dielectric layer element, and the bottom coil element is configured in a spiral and planar arrangement that is identical with each other element.

7. The coil structure of claim 1 wherein an interior terminal end of the top coil element is connected to a positive terminal of an alternating current (AC) power source and an outer terminal end of the bottom coil element is connected to a negative terminal of the AC power source.

8. The coil structure of claim 7 wherein the AC power source is a voltage source inverter (VSI).

9. A series self-resonant coil structure for wireless power transfer, the coil structure comprising:
  a top coil element that is configured in a spiral and planar arrangement;
  a bottom coil element that is configured in a spiral and planar arrangement that is substantially similar to the arrangement corresponding to the top coil element, wherein the top coil element and the bottom coil element are positioned in a stacked arrangement in relation to each other;
  at least one middle coil element that is configured in a spiral and planar arrangement that is substantially similar to the arrangement corresponding to each of the top coil element and bottom coil element, wherein the top coil element, the bottom coil element, and the at least one middle coil element are positioned in a stacked arrangement in relation to each other; and
  a dielectric layer element that is planarly positioned in between each of the top coil element, the bottom coil element, and the at least one middle coil element;
  wherein the top coil element, the bottom coil element, the at least one middle coil element, and the dielectric layer element are aligned to form a first capacitor between the top coil element and the middle coil element and a second capacitor between the middle coil element and the bottom coil element such that the first capacitor and the second capacitor are connected in series with each other and with an inductance of the coil structure, resulting in a series LC impedance, to produce series-resonance in the coil structure, wherein an interior terminal end of the top coil element is connected to a positive terminal of an alternating current (AC) power source and an outer terminal end of the bottom coil element is connected to a negative terminal of the AC power source.

10. The coil structure of claim 9 wherein the thickness of the dielectric layer element is thin relative to the diameter of both the top coil element and the bottom coil element.

11. The coil structure of claim 9 wherein the dielectric layer element is configured in a spiral and planar arrangement that is identical to the arrangement of each of the top coil element and the bottom coil element.

12. The coil structure of claim 9 wherein each of the top coil element and the bottom coil element comprises a spiral copper trace layer.

13. The coil structure of claim 9 wherein the top coil element, the dielectric layer element, and the bottom coil element are arranged in a stacked configuration such that no air gap exists between any of the elements.

14. The coil structure of claim 9 wherein the width of each of the top coil element and the bottom coil element is configured to linearly increase or decrease along its coil trace length.

15. The coil structure of claim 9 wherein a shape of each of the top coil element and the bottom coil element is configured to vary in a concave manner.

16. The coil structure of claim 9 wherein a shape of each of the top coil element and the bottom coil element is configured to vary in a convex manner.

17. The coil structure of claim 9 wherein a shape of one or more of the at least one middle coil element is configured to vary in a concave manner.

18. The coil structure of claim 9 wherein a shape of one or more of the at least one middle coil element is configured to vary in a convex manner.

19. The coil structure of claim 9 wherein each of the top coil element, the dielectric layer element, and the bottom coil element is configured in a spiral and planar arrangement that is identical with each other element.

* * * * *